United States Patent [19]

Goldman

[11] Patent Number: 4,873,918
[45] Date of Patent: Oct. 17, 1989

[54] STRAINER POT WITH WHISTLING SPOUT

[76] Inventor: Geri I. Goldman, 340 Wixon Pond Rd., Mahopac, N.Y. 10541

[21] Appl. No.: 234,515

[22] Filed: Aug. 22, 1988

[51] Int. Cl.[4] ...................... A47J 27/212; A47J 27/21
[52] U.S. Cl. ........................................ 99/403; 99/285; 99/342; 126/388; 210/466
[58] Field of Search ................. 99/279, 285, 307, 308, 99/310, 311, 312, 313, 314, 315, 403, 342; 126/388, 373; 222/475, 465 R, 465.1; 210/465, 466, 467; 220/96

[56] References Cited

U.S. PATENT DOCUMENTS

| 358,333 | 2/1887 | Cary | 220/96 |
|---|---|---|---|
| 1,327,532 | 1/1920 | Duvall | 210/466 |
| 2,021,465 | 11/1935 | Ritscher | 99/403 |
| 2,507,934 | 5/1950 | Reichart | 126/388 |
| 2,753,436 | 7/1956 | Schwaneke | 99/403 |
| 3,044,388 | 7/1962 | Lescure | 99/285 |
| 4,398,454 | 8/1983 | Lambros | 99/285 |

Primary Examiner—Robert W. Jenkins

[57] ABSTRACT

A utensil specifically designed to boil and strain the water from food items. This utensil also produces a whistle to alert the user when the water has come to a boil.

7 Claims, 1 Drawing Sheet

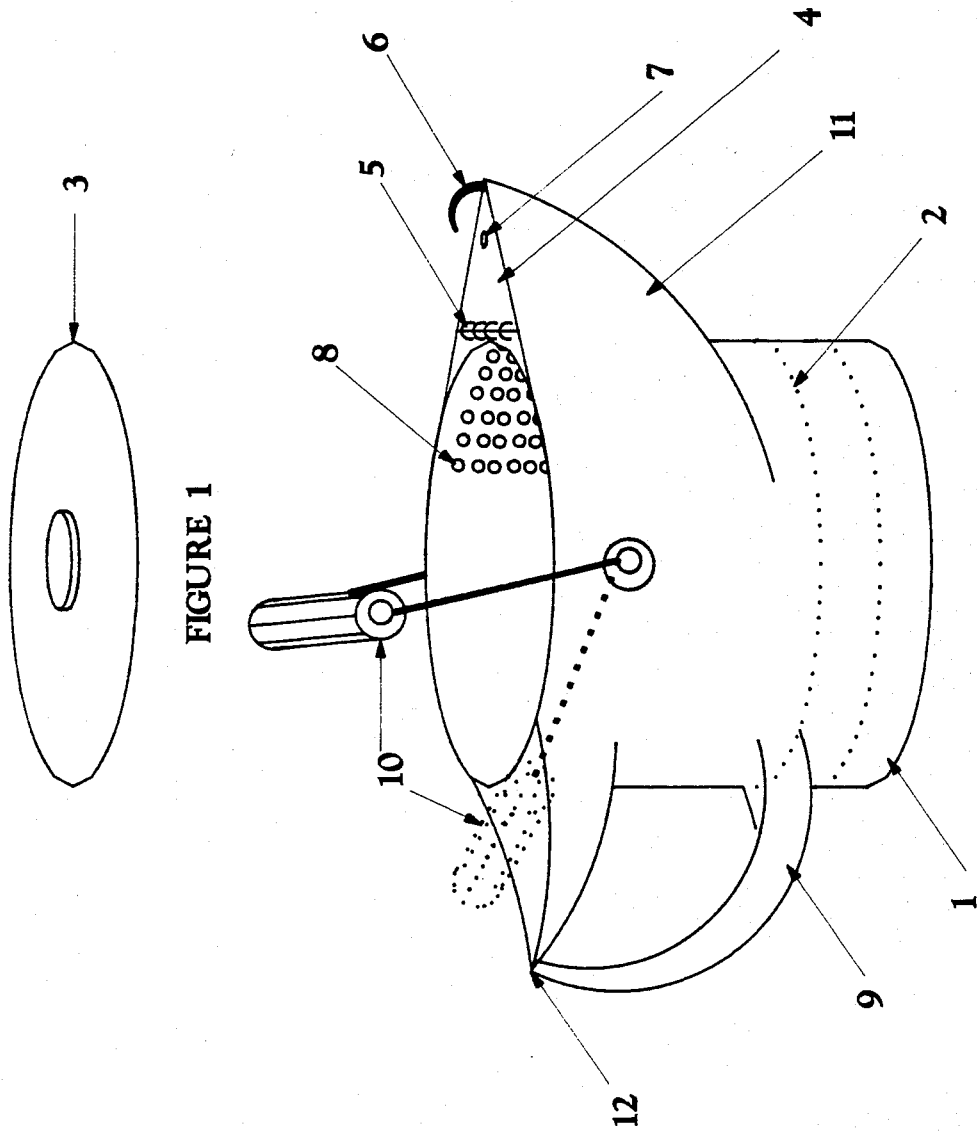

STRAINER POT WITH WHISTLING SPOUT

FIELD OF INVENTION

This invention relates in general to a cooking utensil and specifically to a cooking utensil which will boil and strain the water from the food items.

PRIOR ART

There is a need for a cooking utensil which will act as both a pot and strainer. The present invention will be most useful in the preparation of pasta. The current method of preparing pasta involves boiling the pasta in a pot and then draining the pasta in a separate strainer. In addition to the obvious advantage of having one utensil to locate and clean, this invention will alleviate common mishaps encountered using the pot and strainer. Because of the simplicity of handling one device, this invention will prevent the user from burning themselves due to scalding water that may splash off the strainer and/or randomly escaping steam from the pot. The built in strainer of this invention will eliminate the waste that occurs when pasta overflows or misses the separate strainer during draining. In addition to solving these problems my invention will conveniently alert the cook when the water has come to a boil, thus preventing the water from boiling away. Therefore the present invention has the combined attributes of providing a safe, efficient, and convenient manufacture to prepare food items which has to be boiled and strained.

SUMMARY OF INVENTION

The principal objective of the present invention is to provide a utensil to boil and strain food items. A second objective is for this utensil to produce a shrill sound to alert the cook when the water has come to a boil and for the cook to be able to silence this sound when the food item is cooking. A further objective is to prevent steam and scalding water from burning the cook by projecting the same through a spout. Still another objective is to eliminate the use of a measuring cup in determining the amount of water to be boiled. The final objective is to prevent the possible waste of food when it is drained. All of these objectives are accomplished in a single utensil that is convenient to use, clean and store.

SUMMARY OF DWGS

FIG. 1: Lid

FIG. 2: Side Elevation of Whistling Pot with Strainer Spout

DETAILED DESCRIPTION

The strainer pot with whistle spout as shown in the drawings in its preferred embodiment is manufactured of a heat safe material. The pot (1) has a cylindrical shape. Water may be entered directly into the pot (1) from the faucet using the measuring intervals (2) around the inner circumference to determine the quantity of water required to be boiled. Water is brought to a boil with pot lid (3) on pot (1) and spout cover (4) closed. The hole (7) is the only escape route for the steam produced as the water is heated. Thus the hole (7) will act as a whistle to alert the user when the water has come to boil. The whistle may be silenced by either opening the spout cover (4) and/or simply removing the pot lid (3). The hinge (5) allows spout cover (4) to be opened and closed with lip (6). Once the water has come to boil the food item is entered into the pot (1). When the food item is done it is drained by the perforated area (8) which acts as the present invention's strainer. The perforations are of sufficient size to allow the separation of the boiled food item and the hot water. With the pot lid (3) on pot (1) and the spout (11) tilted downward gravity will discharge the hot water first through the perforated area (8) and then through the spout (11). The boiled food item remains in the pot (1) and if desired a sauce may be entered directly into the pot (1) and the food item can be further prepared. The hinged spout cover (4) allows accessibility for easy cleaning of the inside of the spout. The handles (9) and (10) are used to manipulate present invention. The handle support (12) is used to support handle (10) when it is not in use. The handle support (12) prevents handle (10) from being in contact with the heating element.

Although the preferred embodiment of the invention has been described and illustrated it will be understood that the invention is not limited to the embodiment disclosed, but capable of numerous variations. Accordingly it is intended that the invention be limited only by the spirit and scope of the appended claims.

I claim:

1. A utensil facilitating the boiling and straining of food items, which also alerts the user when the water comes to a boil, is manufactured of a heat safe material comprising of:
   - a cylindrical pot with perforations in an upper area and a plurality of measuring intervals on the inside circumference,
   - a spout which is attached to said pot over said perforated area,
   - a spout cover hinged to top of said spout,
   - a removable pot lid which fits on top of said pot,
   - a fixed pot handle which is attached vertically and opposite said spout to said pot,
   - a rotating pot handle which is attached so same pivots about said pot.

2. The utensil in claim 1 is further characterized by said perforations being sufficient to allow the separation of liquid from food item in said pot.

3. The utensil in claim 1 is further characterized by said spout being sufficient to discharge liquid from said pot.

4. The utensil in claim 1 is further characterized by said spout cover having an adequate hole to allow steam to escape from said pot and produce a shrill sound when said spout cover is closed and said pot lid is on.

5. The spout cover in claim 4 is further characterized by said spout cover having a lip of adequate size to lift spout cover.

6. The utensil in claim 1 is further characterized by said pot handles being sufficient to safely manipulate said pot.

7. The pot handles in claim 6 is further characterized by said rotating pot handle resting on top of said fixed pot handle when not required.

* * * * *